July 8, 1969  F. MASSON  3,454,041

PRESSURE REDUCER WITH CHECK VALVE

Filed Jan. 4, 1967

INVENTOR

FRÉDY MASSON

BY Emory L. Groff Jr.

ATTORNEY

United States Patent Office 3,454,041
Patented July 8, 1969

3,454,041
PRESSURE REDUCER WITH CHECK VALVE
Frédy Masson, Chemin de l'Oiseau, Crissier-Renens, Vaud, Switzerland
Filed Jan. 4, 1967, Ser. No. 607,321
Claims priority, application Switzerland, Jan. 21, 1966, 867/66
Int. Cl. F16k 15/14
U.S. Cl. 137—505.25      1 Claim

ABSTRACT OF THE DISCLOSURE

A pressure reducing valve assembly which is used in connection with a water heater, for example, which includes a housing and a sleeve provided with a plurality of longitudinal slots which is connected at one end to a coupling member at the outlet end of the housing and is connected at its opposite end to the end of the fluid inlet pipe. An annular piston is slidably located between the inlet pipe and the housing and is connected to valve member slidably disposed within the sleeve opposite the inlet end of the pipe. A spring normally urges the piston into position to open the valve to permit fluid to flow to a supply tank; however when fluid pressure in the housing builds up to a point sufficient to balance the force of the spring, pressure against the piston moves the valve into closed position against the seat at the end of the inlet pipe. When the pressure in the housing diminishes due to use of water in the supply tank, the spring will again open the valve to permit water to flow to the tank.

---

A well-known type of pressure reducer comprises a supply conduit for fluid under pressure, issuing into a chamber, an element sensitive to the pressure existing in said chamber being movable in relation to said pressure, said element being connected to a closing member of the conduit.

Reducers of this kind operate in a satisfactory manner, but are however relatively bulky and are often noisy.

The present invention has for its object a pressure reducer of the above-mentioned type, of simple and cheap construction, which is small in size and silent and efficient in operation.

According to the invention, said reducer is characterized in that the pressure sensitive element is of generally annular shape and is disposed coaxially with the fluid supply conduit, the latter being straight.

The accompanying drawing shows, diagrammatically and by way of example, two embodiments of the reducer according to the invention.

Figure 1:
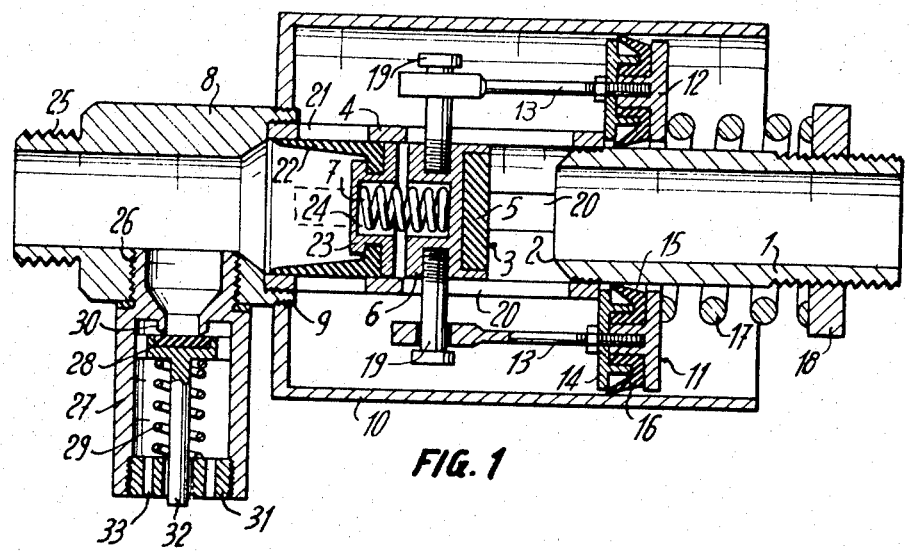
Figure 2:
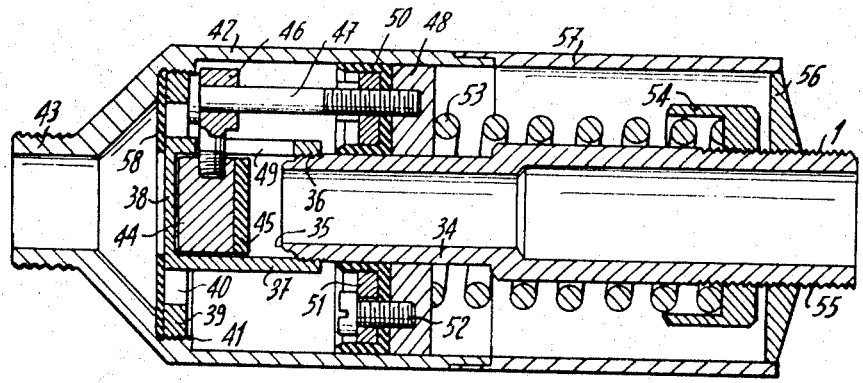

FIG. 1 shows the first embodiment in section.
FIG. 2 is a similar view of the second embodiment.

The pressure reducer comprises a pipe 1 providing a straight conduit for the supply of a fluid under pressure, for example for the supply of water in case the reducer is designed to restrict the pressure in water supply equipment. The reducer may, for example, be mounted on the feed conduit of an accumulation water-heater.

The end of the pipe 1 forms a seat 2 for a movable valve member or poppet 3 slidably mounted in a slit sleeve 4 which is screwed on the end of the pipe 1.

The poppet 3 comprises a pad 5 of relatively flexible material, embedded in a recess of a metallic piece 6 which slides in the sleeve 4. Said piece 6 is provided with a central hole in which is housed a spring 7 urging the piece 6 toward the seat 2. The end of sleeve 4 is screwed in a connecting piece 8 having an outer thread 9 on which is screwed a housing 10 of cylindrical shape, surrounding the sleeve 4 and the end of the pipe 1.

The chamber defined by said housing 10 is closed by an annular piston 11 sliding between the housing 10 and the pipe 1. Said piston comprises two annular parts 12 and 14 pressed one against the other by studs 13. Two sealing members 15, 16 are gripped between the annular parts 12 and 14, so as to ensure water-tightness of the piston, on the one hand, with the pipe 1 and on the other hand with the housing 10. This piston 11 is subjected to the action of a spring 17 surrounding the pipe 1 and bearing against a nut 18 screwed on said pipe. The piston 11 is rigidly connected to the poppet 3 by means of four studs 13, the end of each of said studs 13 having an opening through which passes a corresponding stud 19 which is screwed in the piece 6 of the poppet 3. Each of the four studs 19, of which only two are visible in the drawing, passes into longitudinal slots 20 of the sleeve 4, which permits axial movement of the poppet 3 and piston 11.

The sleeve 4 has, near its end, four slots 21 which are closed by a bell-shaped part 22 of elastic material, such as synthetic rubber. Said part 22 is fixed on a metallic element 23 forced or welded in the sleeve 4. The element 23 has a recess 24 to shelter a part of the spring 7.

The connecting piece 8 has a thread 25 to connect the reducer to the supply conduit, not shown in the drawing. This connection 8 is further provided with a threaded hole 26 in which is screwed a safety valve 27, comprising a poppet 28 subjected to the action of a spring 29 to close an exhaust orifice 30. The poppet 28 and the spring 29 are held in the safety valve 27 by a screwed plug 31 serving as a guide for the rod 32 of the poppet 28. The fluid escaping through said valve may pass through orifices 33 of said plug 31, said orifices 33 serving at the same time as a grip for a spanner to permit of tightening the plug.

The operation of said reducer is simple. The fluid, supplied by the pipe 1 and penetrating into the chamber defined by the housing 10, produces a pressure in said chamber which moves the piston 11 against the action of spring 17. The fluid may penetrate into the housing 10 so long as the pressure which it exerts on the piston 11 does not balance the force of the spring 17 and the thrust of the fluid on the poppet 3. When said balance is reached, the poppet 3 closes the seat 2 of pipe 1, which stops the supply of fluid. As soon as one draws off fluid through the conduit connected to the thread 25, the fluid in the housing 10 moves the piece 22 of flexible material so as to pass through the slots 21 and penetrate into the connecting piece 8. When the pressure in the chamber becomes too low, the spring 17 removes the poppet 3 from the seat 2 to the desired extent so as to reestablish the desired pressure.

Due to the annular piece 22, it is not possible to cause the fluid to penetrate into the housing 10 from the connecting piece 8, because said piece 22 acts as an automatic valve. If the fluid flows back, for example as a result of expansion arising from a rise of temperature in boilers, the liquid escapes through the safety valve 27.

Modifications may of course be made in the reducer described. In particular, piston 11 could be replaced by an annular membrane of flexible material secured, on the one hand, to the housing 10 and, on the other hand, to the pipe 1.

According to an interesting modification, the connection between the piston 11 and the poppet 3 could be effected by elastic elements, in particular by coil springs replacing a portion of the studs 13. This arrangement has for effect to render the reducer insensitive to frost, the piston 11 being then movable under the thrust which arises from the formation of ice in the housing 10.

The reducer shown in FIG. 2 illustrates another embodiment of the construction of which is more simple than that of the reducer according to FIG. 1. The pipe 1 terminates in a part 34 the outer surface of which is machined to form a smooth cylinder. The free end of the part 34 is machined to form a seat 35 and presents a thread 36 on which is screwed a piece 37. The latter has the shape of a sleeve coaxial with the pipe 1 and of which the end remote from the seat 35 is closed by a wall 38 which radially extends in the shape of a radial shoulder 39 in the form of a disk, pierced with holes 40 and having a thread 41 on its outer periphery. Said thread 41 permits af screwing the sleeve 37 inside a cylindrical housing 42 having a thread 43 to permit its connection with a conduit. In this way, the housing 42 is made integral with the pipe 1 through the sleeve 37 which is screwed on one and the other of said two parts.

As in the first embodiment, the sleeve 37 contains a closing body 44 provided with a sealing member 45 and connected by pieces 46 and 47 to the annular piston 48 located between the housing 42 and the part 34 of the pipe 1. There are three pieces 46 and they extend radially passing through longitudinal slots 49 of the sleeve 37.

On one of its faces, the piston 48 carries an annular sealing member 50, of U-shaped section, which has for object to ensure water-tightness of said piston, on the one hand, with the housing 42 and, on the other hand, with the part 34 of the pipe 1. Said sealing member 50 is held in place by a ring 51 which is tightened in the direction of the piston 48 by screws 52.

The piston 48 is subjected to the action of a spring 53 surrounding the pipe 1 and bearing against a nut 54 screwed on an outer thread 55 of said pipe 1. Said thread also carried a disk 56 the periphery of which serves as a bearing for a cylindrical element 57 surrounding the spring 53 and prolonging the housing 42. In this way, the spring 53 is completely enclosed in a casing, and the piston 48 is protected from dust and foreign bodies which could hinder its operation.

It should also be noted that a washer-shaped elastic diaphragm is gripped between the housing 42 and the disk-shaped shoulder 39 prolonging the sleeve 37. Said diaphragm 58 constitutes a return valve which opposes any flow of liquid in a direction from the threaded part 43 to the pipe 1.

The operation of this reducer is entirely similar to that of FIG. 1. The spring 53 holds the closing body 44 away from the seat 35. As soon as the pressure in the housing 42 reaches a sufficient value, it causes movement of the piston 48 against the action of the spring 53, which moves the closing body 44 so as to bring the lining 45 near to, or even in contact with, the seat 35.

In order to adjust the maximum pressure not to be exceeded in the chamber 42, the tension of the spring is adjusted by movement of the nut 54. To reach the latter, it is merely necessary to slide the cylindrical piece 57 on the disk 56.

The reducers described are adapted to be placed on a water conduit, but it is to be understood that they could just as well be applied to control the pressure of another liquid or gaseous fluid.

I claim:

1. A pressure reducer comprising a cylindrical housing, including an inlet end and an outlet end, a straight inlet pipe passing through said inlet end and disposed coaxially in said housing, an annular piston slidably disposed between said pipe and said housing, a valve member connected to said piston for closing said inlet pipe, a coil spring surrounding said inlet pipe and urging said piston into the open position of said valve member, a sleeve having a plurality of longitudinal slots connected to the inner end of said inlet pipe, said valve member being slidably mounted in said sleeve and connected to said annular piston by connecting means passing through a slot in said sleeve, said sleeve including a disc shaped radial shoulder threaded into a corresponding threaded bore adjacent the outlet end of said cylindrical housing, said shoulder having openings for the passage of fluid, and a washer shaped membrane bearing against said shoulder to form a check valve.

References Cited

UNITED STATES PATENTS

| 672,787 | 4/1901 | Lewis | 137—505.25 |
| 2,888,949 | 6/1959 | Evans | 137—505.25 |
| 2,894,526 | 7/1959 | Booth | 137—116.5 |
| 2,899,973 | 8/1959 | Carlson | 137—505.41 |
| 3,038,493 | 6/1962 | Griffith | 137—505.25 |

FOREIGN PATENTS 357,322  11/1905  France.

HAROLD W. WEAKLEY, *Primary Examiner.*

U.S. Cl. X.R.

137—505.11, 525.1